United States Patent
Takenaka

[11] Patent Number: 5,823,722
[45] Date of Patent: Oct. 20, 1998

[54] TOOL HOLDING ATTACHMENT

[75] Inventor: Koji Takenaka, Niwa-gun, Japan

[73] Assignee: Okuma Corporation, Nagoya, Japan

[21] Appl. No.: 742,904

[22] Filed: Nov. 1, 1996

[30] Foreign Application Priority Data

Nov. 6, 1995 [JP] Japan ................................. 7-313453

[51] Int. Cl.⁶ ............................. B23C 9/00; B23B 31/04
[52] U.S. Cl. ...................... 409/230; 408/239 A; 409/233
[58] Field of Search .................................... 409/232, 233,
409/234, 230, 215, 201, 204, 211; 408/239 A,
238, 239 R; 82/158; 29/40, 39

[56] References Cited

U.S. PATENT DOCUMENTS

| 3,757,637 | 9/1973 | Eich et al. | 409/215 |
| 4,412,766 | 11/1983 | Eckstein | 409/233 |
| 4,709,455 | 12/1987 | D'Andrea et al. | 29/40 |
| 5,188,493 | 2/1993 | Heel | 82/158 |

FOREIGN PATENT DOCUMENTS

| 55-90215 | 7/1980 | Japan | 409/230 |
| 4093106 | 3/1992 | Japan | 409/230 |
| 927416 | 5/1982 | U.S.S.R. | 409/230 |

Primary Examiner—William R. Briggs
Attorney, Agent, or Firm—Oliff & Berridge, P.L.C.

[57] ABSTRACT

An automatic tool changer provides an attachment to be easily clamped if the attachment is mounted to a spindle head. Conical disk springs are arranged between the bevel gear for rotating a tool spindle supported by bearings at the center of an attachment body and the spline shaft projecting from the lower end of a shank member of the attachment to be mounted to the main spindle and inserted into the central part of the bevel gear. If the shank member is drawn up by a collet, the conical disk springs are compressed, and large diameter coupling provided at the attachment body engages with a large diameter coupling provided at the lower end face of a spindle ram. The attachment is thereby fixed to a spindle head and the turning torque of the main spindle is transmitted to a tool held by the attachment. If the drawing up of the shank member by the collet is released, a small diameter coupling provided at the shank member engages with a small diameter coupling provided at the attachment body, and the turning torque of the main spindle is transmitted for indexing the mounting position of the attachment by swivelling.

4 Claims, 6 Drawing Sheets

TOOL HOLDING ATTACHMENT

BACKGROUND OF THE INVENTION

1. Field of the Invention

The present invention relates to an attachment for holding a cutting tool to be fixed to an end of a spindle head of a machining center, and an automatic tool changer having an exchanging arm for automatically mounting and dismounting the attachment and the cutting tool itself and a main spindle of the machining center.

2. Description of the Related Art

Currently, attachments for holding cutting tools are relatively large, and can not be contained in tool magazines used for storing tools alone. As a result, an attachment stand must be separately prepared in addition to the tool magazine. When an attachment is mounted to the spindle head, the spindle head should be moved to the position of the stand for mounting operations.

When the attachment is mounted to the spindle head, a hooked portion 84 having an L-shaped section at a tip of a piston 83 in a hydraulic cylinder provided in the spindle head side is engaged with a jaw portion 82 of a coupling 81 of a large diameter provided in the attachment 8. Then, the attachment 8 is clamped by pulling up the jaw portion 82 with the piston 83.

There are also such type attachments, with gripping V-grooves on their outside periphery having the same size as an ordinary tool (solid tool), and are contained in the magazine together with the tool. This type attachment is fixed to the tip of the main spindle by being gripped in a similar way to ordinary tools by a common tool changing arm used for gripping and exchanging ordinary tools. When this attachment has been fixed to the tip of the main spindle, a casing portion of the attachment body is locked so as to not rotate by such a means that the casing portion of the attachment engages with a pin hole or the like for transmitting the rotation of the main spindle solely to a tool spindle provided inside the casing portion. Accordingly, an ordinary tool changing arm can be used for exchanging this type attachment.

However, the comparatively large size attachment mentioned in the related art has a complicated structure because a hydraulic cylinder should be arranged in the spindle head side, and hydraulic piping is further necessary. In addition, there are such problems that facilities for piping are necessary, thereby raising the cost. Furthermore, the scale of the facilities becomes larger due to the need for another putting stand for exchanging attachments. Interference with other equipment must be taken into consideration.

On the other hand, there is such a problem that when the automatic tool changing arm for conventional tools is also used for changing the attachments, only the attachments where the portion gripped by the changing arm has the same dimensions as that of the tools can be changed. In addition, there is such a problem that, even if automatic indexing by swivelling is performed by gripping the attachment using the changing arm at the position of mounting the attachment to the main spindle, automatic indexing is impossible because a rotation locking pawl attached to the changing arm is an obstacle. Accordingly, there is such a problem that in the attachment having the gripping V-groove of the same size as that of an ordinary tool, the attachment has small machining capability because inner structural mechanisms become respectively small by the limitation of overall size.

In addition, in order to perform multi-plane machining automatically using various attachments, the following requirements should be fulfilled:

(1) Attachments for various directions should be prepared in a tool magazine.

(2) An indexing device for the attachment should be prepared on the spindle head side.

(3) Attachment indexing should be done on the attachment specially provided putting stand.

Consequently, effective attachment exchanging works could not so far be performed.

SUMMARY OF THE INVENTION

An object of the present invention is to provide an attachment which can be clamped simply and automatically without using special equipment such as a hydraulic piston when the attachment is fixed to the spindle head, taking into consideration the problems existing in the related arts.

It is another object of the present invention to provide an automatic tool changer which can carry not only ordinary tools, but also attachments of a large size different from that of ordinary tools.

It is another object of the present invention to provide a method for automatically performing attachment indexing by swivelling in the state where the attachment is held at the position of the main spindle.

According to the present invention, there is provided an attachment removably mounted to a spindle head of a machine tool, for holding a tool removably thereto comprising:

a pull stud which can be inserted into a main spindle from its tip and gripped by drawing with a collet arranged inside the main spindle;

a shank member which has the pull stud fixed at its upper end, and has a flange and a central shaft at its lower end face, and has a shank side coupling on a lower end face of the flange;

a sleeve into which the central shaft is slidably inserted, and which has a gear at its lower end for transmitting the driving torque of the main shaft to a tool held by the attachment;

an attachment body which rotatably holds the sleeve, which has a coupling of small diameter at the inner side of the upper end face engaging with the shank side coupling, and has a large diameter coupling at the outer side of the upper end face engaging with a head side coupling provided on a spindle head of the machine tool for fixing the attachment body to the spindle head; and an elastic member which is arranged between the sleeve and the central shaft, and forcedly fixes the large diameter coupling to the head side coupling in a compressed state, and fixes the shank member by forcedly pushing the central shaft in such a direction that the shank side coupling engages with the small diameter coupling in an expanded state.

According to the attachment constructed as mentioned above, the large diameter coupling of the attachment is clamped by being strongly and automatically pressed to the spindle head of the machine tool through the elastic member, by the mere gripping and pulling up of the pull stud with the collet in the main spindle through ordinary tool mounting operations. In addition, if gripping of the pull stud is released, the shank member and the attachment body are fixed by the elastic member. Since the shank member and the attachment body do not rotate, they can be handled easily. Gripping of the attachment can be done in a single action, without providing special mechanisms to a machine tool side.

In addition, according to another construction, the attachment body is provided with a groove around its peripheral surface for holding this attachment body.

According to this construction, the attachment can be gripped easily like a tool.

In addition, according to another construction, the attachment body is provided with a groove on its peripheral surface for positioning this attachment body.

According to this construction, stable gripping and carrying of the attachment can be done. Furthermore, it is possible to keep the reference position of indexing by swivelling so that the mounting position of the attachment is constant.

In addition, according to another construction, one or more engaging portions are provided, on the upper end face of the flange, for engaging with an engaging portion provided at the lower end part of the main spindle. When the head side coupling comes in contact with the large diameter coupling, the driving torque of the main spindle is transmitted through the shank member for rotating the tool to a tool held by the attachment. When the head side coupling does not come in contact with the large diameter coupling, and the shank side coupling engages with the small diameter coupling, the driving torque of the main spindle is transmitted to the attachment body for performing indexing by swivelling of the attachment mounting position.

According to this construction, the driving torque of the main spindle can be used for rotating the tool or for only rotating the attachment body by changing the engaging state of the large diameter couplings and the small diameter couplings.

In addition, according to another construction, there is provided an automatic tool changer comprising:
  a tool magazine storing an attachment and a tool having a gripping groove;
  a tool exchanging arm provided a gripping mechanism for performing mounting, dismounting, and exchanging of the attachment or the tool and the main spindle of the machine tool by picking them up from the tool magazine; and
  the gripping mechanism of the tool exchanging arm is provided with a gripping part for the attachment and a gripping part for the tool; and
  the gripping mechanism comprises a travelling mechanism moving forward and backward along the axis of the tool exchanging arm and a swivelling mechanism for positioning the attachment by swivelling about the axis of the tool exchanging arm, and selectively performs mounting, dismounting, and exchanging of the attachment or the tool.

According to this construction, by using the gripping part for the attachment and the gripping part for the tool, exchanging operations of the attachment and the tool can be performed in the same operation by means of the single tool exchanging arm.

In addition, according to another construction, the gripping part for the attachment is provided with a projection on its gripping surface for preventing the rotation of the attachment.

According to this construction, the attachment does not rotate during carrying operation and can perform stable carrying operations.

In addition, according to another construction, there is further provided an attachment holding part for holding the attachment in a swivel manner and performing mounting operations of the attachment to the main spindle of the machine tool through the gripping part for the attachment having the projection and further positioning operations by swivelling the attachment to the main spindle of the machine tool through the attachment holding part.

According to this construction, after the attachment has been stably mounted to the main spindle of the machine tool, the attachment is held by the attachment holding part in a swivel manner and can be indexed by swivelling in the required direction.

In addition, according to another construction, the gripping part for the attachment is provided with a travelling mechanism for moving the projection forward and backward. This gripping part mounts the attachment to the main spindle of the machine tool when the projection is projected, and positions the attachment to the main spindle of the machine tool by swiveling when the projection is withdrawn.

According to this construction, after the attachment has been mounted to the main spindle of the machine tool, the attachment can be indexed by swivelling in the required direction with the attachment held by the attachment holding part in a swivel manner.

In addition, according to another construction, the attachment holding part is provided with plural rolling elements.

According to this construction, the held attachment can be swivelled smoothly and can be accurately indexed by swivelling.

Furthermore, according to another construction, there is provided a method for indexing a mounting position of an attachment to a main spindle of a machine tool by swivelling comprising steps of:
  provisionally mounting of the attachment to the main spindle of the machine tool;
  holding the groove of the attachment;
  engaging the shank side coupling of the attachment with the small diameter coupling by making the head side coupling release from the large diameter coupling; and
  performing indexing by swivelling the attachment by transmitting driving torque of the main spindle of the machine tool to the attachment body.

According to this construction, efficient indexing of the attachment is possible because the driving torque of the main spindle can be used for rotating the tool and for rotating the attachment body only by changing the engaging state of the large diameter couplings and the small diameter couplings.

DESCRIPTION OF THE PREFERRED EMBODIMENT

A preferred embodiment of the present invention will now be described with reference to the accompanying drawings.

Figure 1:
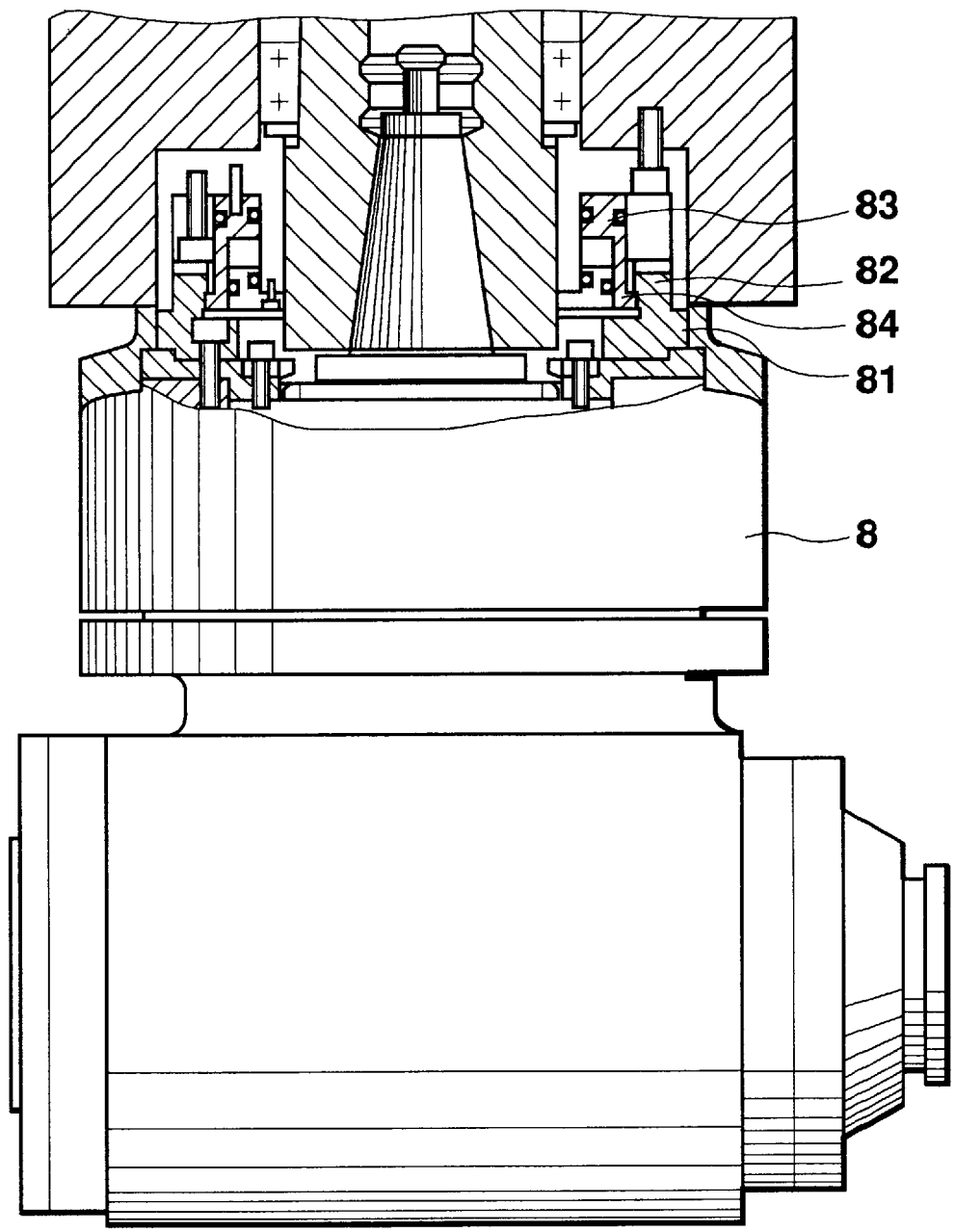
FIG. 1 is a drawing illustrating an attachment and its mounting mechanism according to a related art.
Figure 2:
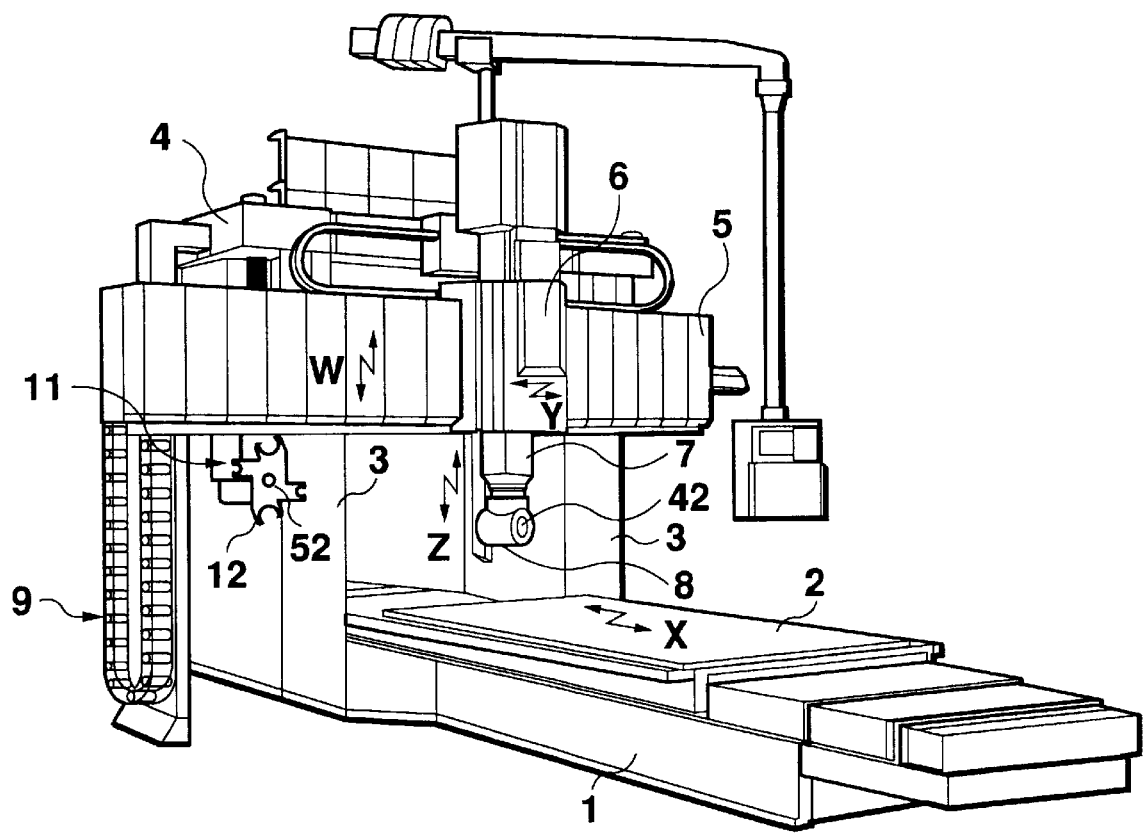
FIG. 2 is a drawing showing an external appearance of a machining center having an attachment and a tool changer according to an embodiment of the present invention.

In a machining center shown in FIG. 2, a table 2 is mounted on a bed 1 installed on a floor so that the table 2 can travel in the X axis direction (forward and backwards) to positioned. Columns 3 are installed vertically on the floor at both sides of the bed 1. A top beam 4 is fixed on top of the columns 3. The column 3 has a guideway on its front side in the W axis direction (vertical). A cross rail 5 is mounted on these W axis guideways in such way that travel and positioning are possible. The cross rail 5 has a guideway on its front side in the direction of Y axis (right and left). A spindle head 6 is mounted on this Y axis guideways so that its travelling and positioning are possible, and a spindle ram 7 is provided in the spindle head 6 in such a way that travel and positioning in the of Z axis direction (vertical) are possible.

A tool magazine 9 is arranged at the left end of the column 3 standing at the left side of the machining center. In this tool magazine 9, an attachment 8 which can be mounted on the tip of the spindle ram 7 so as to be dismountable, and a tool which is mounted directly to a main spindle 22 are stored.

In addition, a tool exchanging arm unit 11 is arranged at the left and lower part of the cross rail 5. This tool exchanging arm unit 11 can swivel in the horizontal plane toward the tool magazine 9 side and the spindle ram 7 side, and also can move the arm swivelling axis 52 in the horizontal and vertical directions by swivelling and by horizontal straight movement. In addition, the tool exchanging arm unit 11 has a twin arm type combined exchanging arm 12 which has grippers A1 and A2 for tools having different gripping diameters and grippers B1 and B2 for the attachment point-symmetry (see FIG. 3). The grippers A1 and A2 are the grippers to be used when ordinary tools are exchanged, and grip the tools steadily by engaging with V-shaped grooves formed on the tools. In addition, the gripper B1 is an attachment exchanging gripper to be used when the attachment 8 is exchanged and carried, and the gripper B2 is an attachment indexing gripper to be used when the attachment 8 is indexed by swivelling at the position of the spindle head 6. These grippers B1 and B2 also grip the attachment 8 steadily by engaging with V-shaped grooves formed on the attachment 8. In this embodiment of the present invention, a combined exchanging arm 12 having 4 grippers is shown as an example. Though it is not shown in the figure, an auxiliary finger which can be opened and closed is provided at the tip of the respective grippers for preventing the falling of the gripped tool and attachment. In addition, locking pawls 14 are provided on the pair of tool exchanging grippers A1, A2 and on the attachment exchanging gripper B1 for preventing positional shifts. However, the locking pawl is not provided on the attachment indexing gripper B2 because the whole of the attachment 8 should be rotated in the gripper. In addition, the auxiliary finger is constructed so as not to grip the attachment 8 too tightly, in order to allow its free rotation. Furthermore, the combined exchanging arm 12 can be indexed by swivelling about a swivelling axis 52 by control machinery such as NC, and also can be moved and positioned in the direction of the swivelling axis 52.

Figure 3:
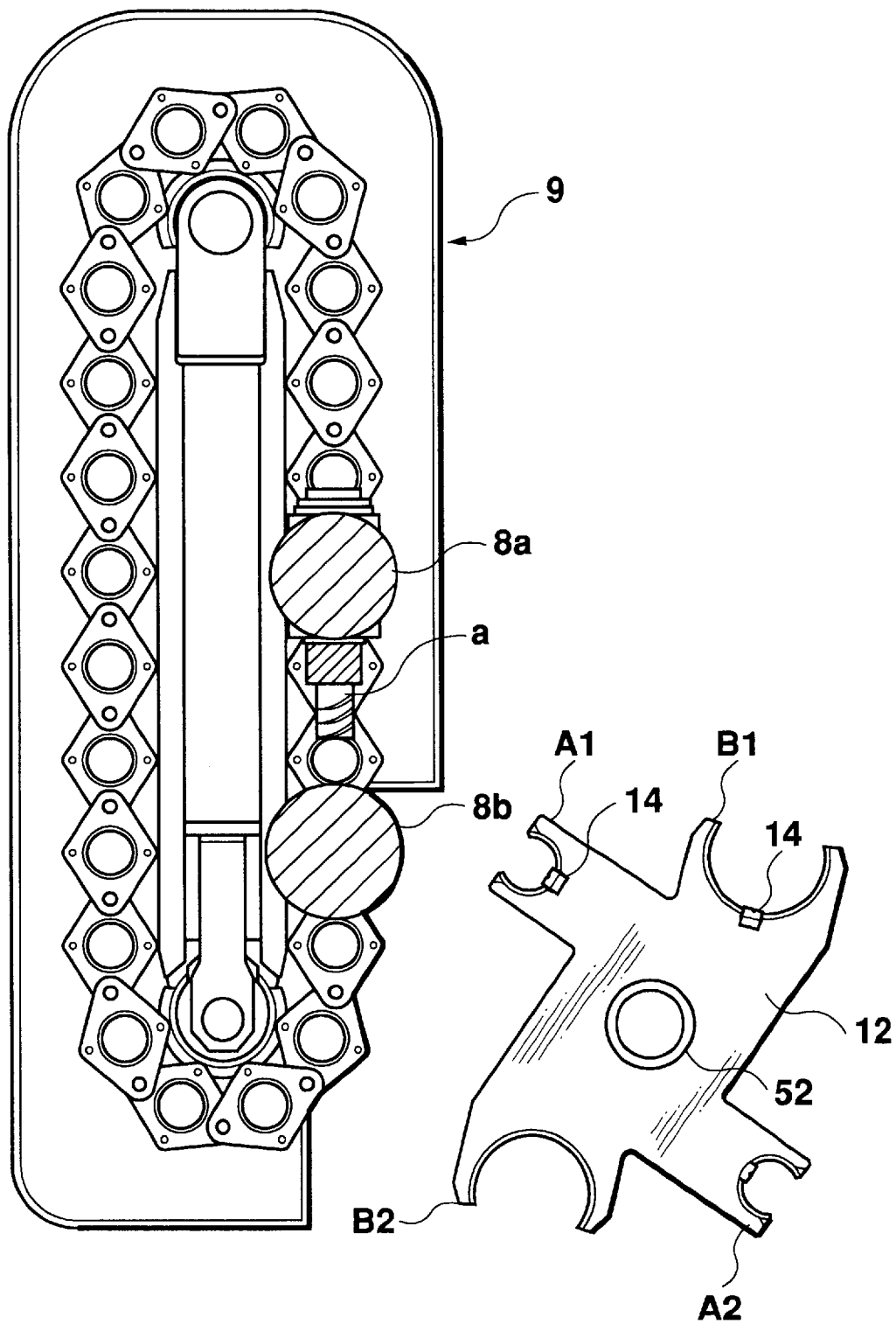
FIG. 3 is a drawing illustrating a tool magazine and a tool exchanging arm according to an embodiment of the present invention.

The combined exchanging arm 12 and the tool magazine 9 are shown in FIG. 3. In this tool magazine 9, attachments 8, which have a shank of the same size as that of ordinary tools but a large body, are stored mixed with ordinary tools. FIG. 3 shows an example where an attachment 8a holding tool "a" and an attachment 8b holding no tool are stored.

For mounting the attachment 8b with no tool to the spindle head 6, the combined exchanging arm 12 first mounts the attachment 8b to the spindle head b and then attaches the tool to the attachment 8b mounted.

Figure 4:
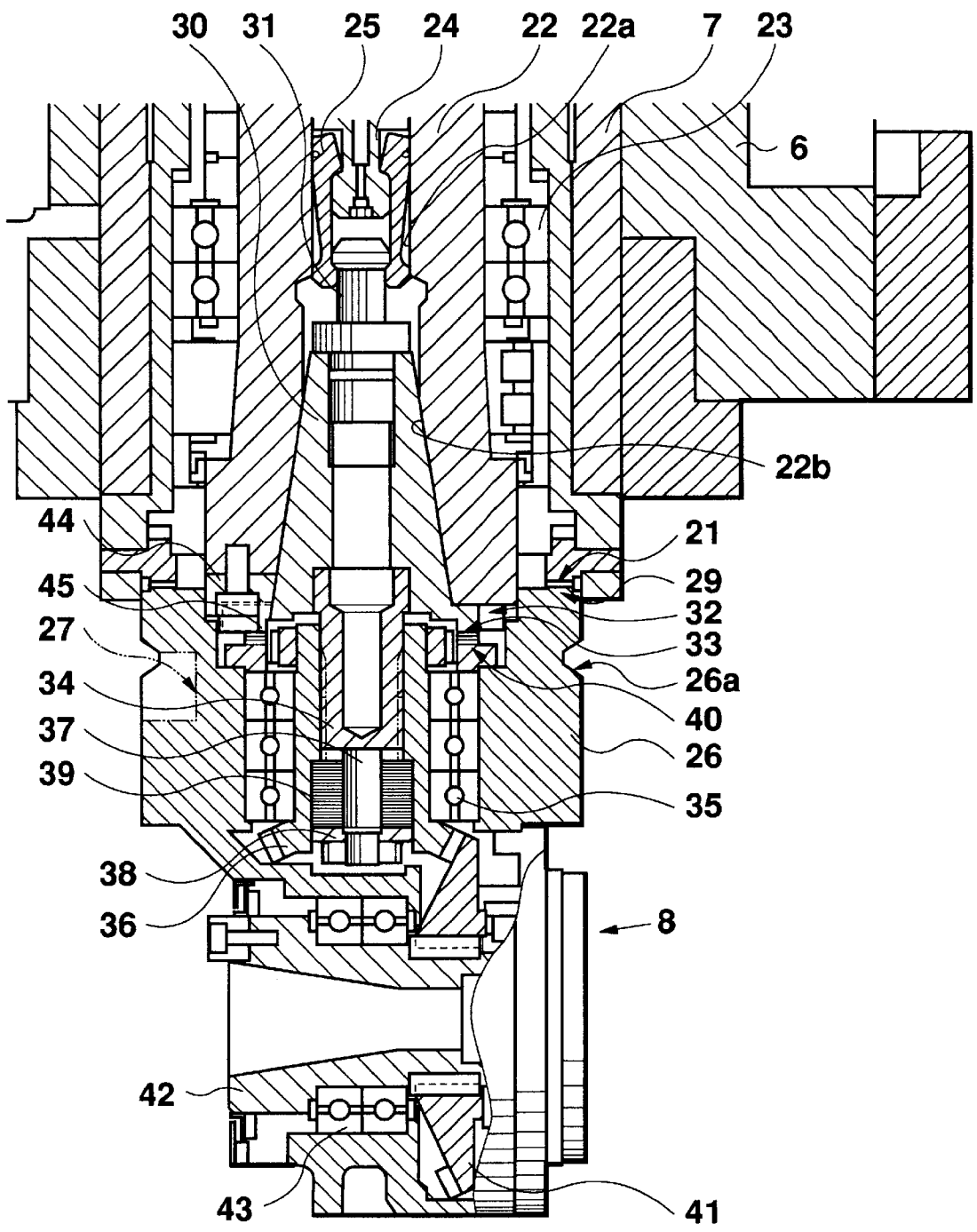
FIG. 4 is a cross sectional view showing a state of mounting an attachment according to an embodiment of the present invention.

As shown in the sectional view of FIG. 4, the spindle ram 7 is provided in the spindle head 6 so as to travel in the axial direction of the main spindle 22. A coupling of large diameter 21 is provided at the lower end face of this spindle ram 7 for fixing the attachment 8.

In addition, the main spindle 22 having a through hole is rotatably supported by bearings 23 in the spindle ram 7. A tip of the through hole 22a of the main spindle 22 is formed in a tapered shape so as to be capable of receiving a shank part of tools and attachments. In addition, a draw bar 24 is inserted into the through hole 22a so as to move in the axial direction by a hydraulic cylinder unit not shown in the figure. A collet 25 which is opened and closed by the draw bar 24 is arranged at the tip of the draw bar 24. A pull stud 31 fixed to the shank part of tools, etc. is gripped by this collet 25.

On the other hand, a V-shaped gripping groove 26a of a size different from that of the V-shaped gripping groove of ordinary tools is formed by cutting on the outer periphery 26 of the attachment 8, and engages with the grippers B1 and B2 for the attachment. Furthermore, a keyway 27 is cut in the V-shaped groove 26a for engaging with the pawl 14 of the gripper B1 for exchanging the attachment. In addition, on the surface of the body 26 of the attachment 8 facing to the spindle ram 7, a large diameter coupling 29 is provided for engaging with the large diameter coupling 21 provided on the lower end face of the spindle ram 7.

Furthermore, the attachment 8 has a shank part 30 which is fit into the taper hole 22b of the main spindle 22 in the case of mounting it to the spindle head 6, and a pull stud 31 which is gripped by the collet 25 to be opened and closed by the draw bar 24.

A small diameter coupling 33 is provided by concentrically cutting on the lower end face of a flange 32 of the lower end face of the shank part 30 inside the large diameter coupling 29. Furthermore, a spline shaft 34 having a part of small diameter 37 at its tip is projected at the central part of the shank part 30. The spline shaft 34 is engaged with a female spline formed in a sleeve part of a bevel gear 36 supported rotatably by bearings 35 at the central part of the attachment body 26. A collar 38 clamped by a nut is arranged at the tip of the part of small diameter 37. Conical disk springs 39 are arranged between the collar 38 and the bevel gear 36. The group of the bevel gear 36 and the attachment body 26 and the group of the shank part 30 and the spline shaft 34 are always forced so as to approach each other in a stressed state by these conical disk springs 39.

In addition, a small diameter coupling 40, which should be engaged with the small diameter coupling 33 provided by cutting on the lower end face of the flange 32, is attached to the face of the attachment body 26 facing the lower end face of the flange 32.

The position at which the coupling of large diameter 21 engages with the large diameter coupling 29 is not flush with the position of the engagement of the couplings of small diameter 33 and 40. Consequently, when an attachment 8 is mounted to the main spindle and the large diameter couplings 21 and 29 engage with each other, the small diameter couplings 33 and 40 do not engage. The coupling of small diameter 33 and 40 may comprise crown gears as shown in FIG. 4, serrations, or another suitable construction.

A tool spindle 42 provided with a bevel gear 41 to be engaged with the bevel gear 36 is arranged inside the lower part of the attachment body 26. The tool spindle 42 is supported rotatably by a bearing 43 making a certain angle with the axis of the main spindle 22. In the present invention, the tool spindle 42 makes a right angle with the main spindle 22, but it is not necessary to restrict this angle to a right angle.

In addition, a drive key 44 is attached to a part of the lower end face of the main spindle 22 for steadily transmitting the rotation of the main spindle 22. This drive key 44 can be fit into a keyway 45 cut to the flange 32 of the shank part 30. The drive key 44 is elongated in the axial direction of the main spindle so as to keep an engaged state with the keyway 45 of the flange 32, even in cases where minute clearance is produced between both tips of both large diameter couplings 21 and 29 after releasing the engagement of the large diameter couplings 21 and 29 through separating the attachment body 26 from the main spindle ram 7 after engaging of the small diameter couplings 33 and 40 because of the approach of the shank part 30 toward the attachment body 26 due to the conical disk springs washers 39 after the releasing of the pull stud 31 from the collet 25.

Figure 5:
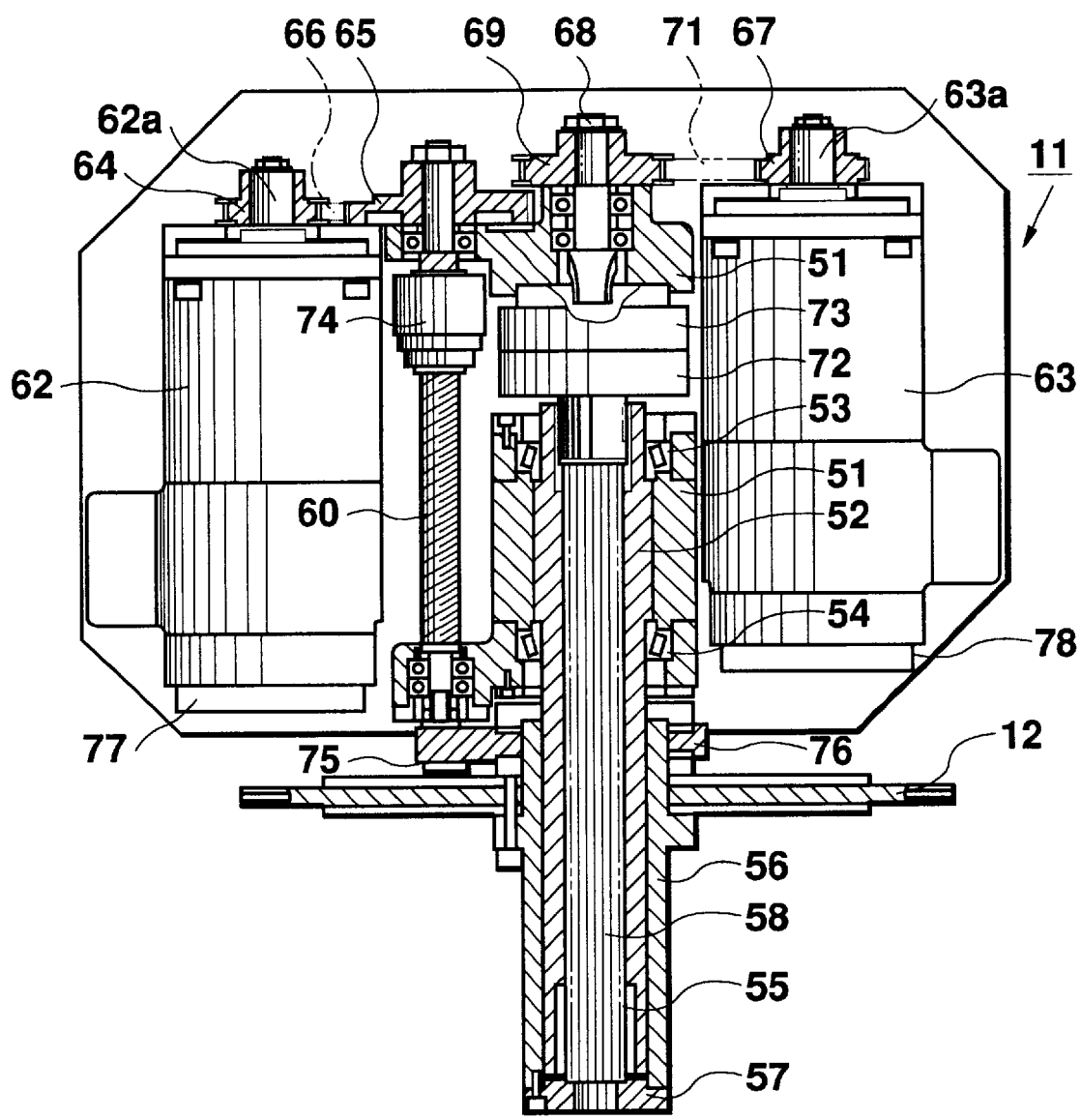
FIG. 5 is an elevational sectional view of a tool exchanging unit according to an embodiment of the present invention.

Next, the attachment 8 and the tool exchanging arm unit 11 are explained on the basis of FIG. 5. A hollow swivelling axis spindle 52 is supported rotatably by bearings 53 and 54 in a unit body 51. The longitudinal lower half of the swivelling axis spindle 52 is projected from the unit body 51, and a female spline 55 is fit at the tip of the central hole. A hollow spindle 56 is fit movably in the axial direction on the external surface of the extended part of the swivelling axis spindle 52. Further, the tip end of the spline shaft 58 is fixed to a cover 57 fixed to the tip of the hollow spindle 56. In addition, the spline shaft 58 engages with the female spline 55. Further, the combined exchanging arm 12 is fixed to the hollow spindle 56 at the position near the unit body 51. Accordingly, the hollow spindle 56 is capable of sliding vertically together with the spline shaft 58, and the combined exchanging arm 12 simultaneously moves vertically.

In addition, a servomotor for mounting and dismounting 62 and a servomotor for swivelling 63 are fixed to the unit body 51, which drive the mechanisms in the direction parallel to the swivelling axis spindle 52. A pulley 64 is fit to an output spindle 62a of the servomotor for mounting and dismounting 62. In addition, a pulley 65 is fit to the end part of a ball screw 60 arranged parallel to the output spindle 62a, and a drive belt 66 is laid across the pulleys 64 and 65.

In a similar way, a pulley 67 is fit to an output spindle 63a of the servomotor for swivelling 63. In addition, a pulley 69 is fit to the end part of an arm driving spindle 68 connected through a coupling 73 and a speed reducing gear 72 for reducing the speed of the swivelling axis spindle 52 and the spline shaft 58. Further, a drive belt 71 is laid across the pulleys 67 and 69. In addition, an angle sensor 77 is assembled in the servomotor for mounting and dismounting 62 for detecting the axial position, and an angle sensor 78 is assembled in the servomotor for swivelling 63 for detecting the swivelling angle.

A ball nut 74 is engaged with the ball screw 60 which is rotated by the servomotor for mounting and dismounting 62. Further, the rear end of a guide spindle for mounting and dismounting 75 supported so as to be movable in the axial direction is fixed to the ball nut 74 through connecting fittings not shown in the figure. Further, the tip of the guide spindle 75 is fixed to a bracket for mounting and dismounting 76 engaged with the external periphery of the hollow spindle 56.

Next, operation of the present embodiment will be described. When an attachment 8 is stored in the tool magazine 9, the conical disk springs washers 39 are in the extended state and the shank part 30 and the attachment body 26 approach by the enforcing effect of the conical disk springs washers 39 keeping the small diameter couplings 33 and 40 engaged. Consequently, the shank part 30 can not rotate to the attachment body 26. Accordingly, the tool spindle 42 also does not rotate to the attachment body 26, and the key of the tool spindle 42 can keep a certain relative position to the keyway 45 of the flange 32 of the shank part 30. Consequently, when an attachment 8 is stored in the tool magazine 9, it is possible that an attachment 8 is kept so as to direct the required direction, and the direction of an attachment 8 is recognized easily by a control part not shown in the figure.

When an attachment 8 is picked up from the tool magazine 9 for carrying, the V-shaped groove 26a of the attachment body 26 is gripped by the attachment exchanging gripper B1 of the combined exchanging arm 12 of the exchanging arm 11. In this case, the pawl 14 of the gripper B1 engages with the keyway 27 provided by cutting on a part of the V-shaped groove 26a for preventing the shift of the position of the attachment 8 in the gripper B1. Consequently, the attachment 8 can be carried to the spindle head 6 without causing positional shift of the keyway 45 of the flange 32 of the shank part 30. As the result, the keyway 45 of the flange 32 can be exactly engaged with the drive key 44 of the main spindle 22.

After the attachment 8 has been carried to the position of the main spindle 22, the shank part 30 is inserted into the taper hole 22b at the tip of the main spindle 22. Then, the draw bar 24 is drawn up in the upward direction of the main spindle 22 by a hydraulic cylinder and the pull stud 31 is gripped by the collet 25. In this case, the attachment body 26 is also partially pulled up by the conical disk springs 39 together with the attachment 8. Then, the large diameter coupling 29 of the attachment body 26 engages with the large diameter coupling 21 provided at the lower end face of the main spindle ram 7. Accordingly, the attachment body 26 is fixed, and further drawing up is prevented.

When the shank part 30 and the flange 32 are drawn up together by drawing up the pull stud 31 in this state, the conical disk springs 39 are compressed through the collar 38 attached to the part of small diameter 37 at the tip of the spline shaft 34. Because the attachment body 26 is fixed through the engagement of the large diameter couplings 21 and 29, the engagement of the small diameter couplings 33, 40 is released in turn.

After that, the drawing up is completed so that the shank part 30 is pressed tightly to the inner surface of the taper hole 22b at the tip of the main spindle 22. In this case, because the conical disk springs 39 are deformed by compression, the upward spring force of the conical disk springs 39 acts upon the contact surface between the large diameter couplings 29 and 21 as compressive force through a bevel gear 36 and bearings 35. As a result, the attachment body 26 is firmly pressed to the spindle ram 7. Accordingly, the attachment body 26 can be automatically clamped without other means such as an hydraulic mechanism.

Next, a method for indexing the attachment body 26 will be described. First, the attachment 8 is carried to the tool exchanging position at the spindle head 6 by the tool exchanging arm unit 11 and provisionally fixed. Then, the gripping of the attachment body 26 by the attachment exchanging gripper B1 is released. Further, the combined exchanging arm 12 is swivelled by driving the servomotor for swivelling 63 by a command from an NC unit not shown in the figure, and the V-shaped groove 26a of the attachment body 26 is gripped by the attachment indexing gripper B2 having no locking pawl.

Next, the gripping of the pull stud 31 by the collet 25 is released by forward (downward) movement of the draw bar 24 pulled up by an hydraulic cylinder not shown in the figure. At the same time, the engagement of the large diameter couplings 21 and 29 is released by moving the combined exchanging arm 12 in the axial direction of the main spindle (downwards) in the first dismounting operation through rotation of the ball screw 60 by driving the servomotor for mounting and dismounting 62 by a command from an NC unit not shown in the figure. In this case, it is preferable that the release distance be determined so as to allow minute clearance between the tips of the large diameter couplings 21 and 29. The shank part 30 approaches the attachment body 26 due to the enforcing effect of the conical disk springs 39 in the extended state, and the small diameter couplings 33 and 40 engage in turn with each other.

However, the drive key 44 attached to the tip of the main spindle 22 holds the engaged state with the keyway 45 of the flange 32. If the main spindle 22 is rotated by a required angle by a servomotor not shown in the figure from a command from an NC unit, the rotation is transmitted to the drive key 44, the flange 32, the small diameter couplings 33 and 40, and the attachment body 26. Consequently, the attachment 8 is indexed by swivelling as a whole unit inside the attachment indexing gripper B2.

After the indexing has been completed, the combined exchanging arm 12 is elevated by driving the servomotor for mounting and dismounting 62. That is to say, the attachment body 26 is moved to the position of the spindle head 6 through the first mounting operation of the attachment indexing gripper B2. The large diameter couplings 21 and 29 then engage with each other and the pull stud 31 is gripped and clamped by the collet 25 through pulling up the draw bar 24 by an hydraulic cylinder unit. As a result, the attachment 8 is mounted again to the spindle head 6. At this time, because the engagement of the small diameter couplings 33 and 40 is released, the rotational driving torque is transmitted to the tool spindle 42 through the shank part 30, the spline shaft 34, the bevel gears 36 and 41, and it becomes possible to start cutting operation again by a tool not shown in the figure.

Figure 6:
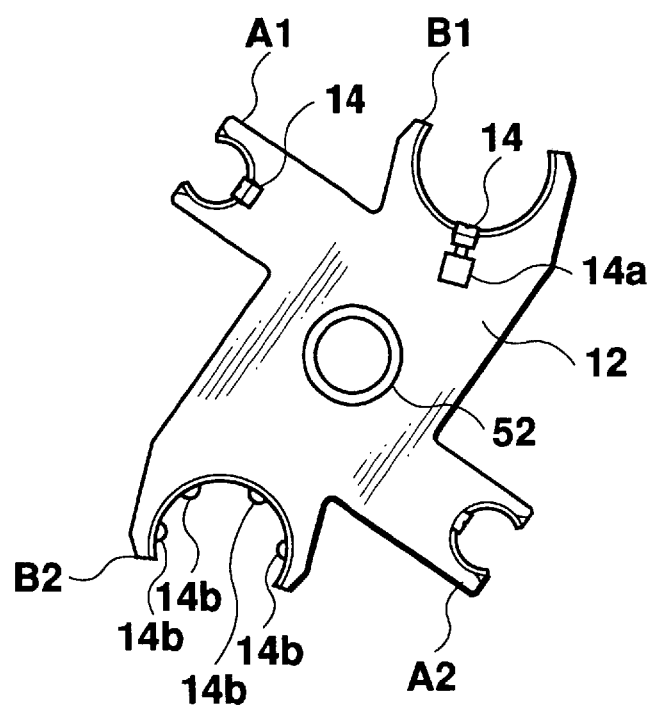
FIG. 6 is a drawing illustrating another example of a tool exchanging arm according to an embodiment of the present invention.

According to another embodiment of the combined exchanging arm 12 as shown in FIG. 6, the locking pawl 14 of the attachment exchanging gripper B1 can be replaced with a movable pawl which can be projected and withdrawn in the gripper by means of a hydraulic piston, an electromagnetic solenoid, a cam, etc. FIG. 6 shows an example of the arrangement of a hydraulic cylinder. By employing such a movable locking pawl 14, it becomes possible to utilize the attachment exchanging gripper B1 and the attachment indexing gripper B2 in common.

According to another embodiment of the combined exchanging arm 12 as shown in FIG. 6, it is possible to arrange plural rolling bodies 14b on the inside periphery of the attachment indexing gripper B2 of the combined exchanging arm 12 in order to allow smooth rotation of the attachment 8. The rolling bodies may be rollers and balls, for example.

What is claimed is:

1. An attachment removably mounted to a spindle head of a machine tool for holding a tool removably attached thereto comprising:

a pull stud which can be inserted into a main spindle from its tip and gripped by drawing with a collet arranged inside the main spindle;

a shank member which has the pull stud fixed at its upper end, a flange and a central shaft at its lower end face, and a shank side coupling on a lower end face of the flange;

a sleeve into which the central shaft is slidably inserted, and which has a gear at its lower end for transmitting the driving torque of the main spindle to a tool held by the attachment;

an attachment body which holds the sleeve rotatably, which has a small diameter coupling at the inner side of the upper end face engaging with the shank side coupling, and has a large diameter coupling at the outer side of the upper end face for engaging with a head side coupling provided on the spindle head of the machine tool for fixing the attachment body to the spindle head; and an elastic member which is arranged between the sleeve and the central shaft, and forcedly fixes the large diameter coupling to the head side coupling in a compressed state, and fixes the shank member by forcedly pushing the central shaft in such a direction that the shank side coupling engages with the small diameter coupling in an expanded state.

2. A tool holding attachment according to claim 1, wherein the attachment body is provided with a groove around its peripheral surface for holding the attachment body.

3. A tool holding attachment according to claim 1, wherein the attachment body is provided with a groove on its peripheral surface for positioning the attachment body.

4. A tool holding attachment according to claim 1, wherein one or more engaging portions are provided on the upper end face of the flange for engaging with an engaging portion provided at the lower end part of the main spindle;

the driving torque of the main spindle is transmitted to a tool held by the attachment through the shank member for rotating the tool when the head side coupling comes in contact with a large diameter coupling; and the driving torque of the main spindle is transmitted to the attachment body for performing indexing of the mounting position of the attachment by swivelling when the head side coupling does not come in contact with the large diameter coupling, and the shank side coupling engages with the small diameter coupling.

* * * * *